United States Patent
Jung et al.

(10) Patent No.: US 10,488,700 B2
(45) Date of Patent: Nov. 26, 2019

(54) ELECTRICAL POLARIZATION FILTER, ELECTRONIC APPARATUS INCLUDING THE SAME, AND METHOD OF OPERATING THE ELECTRONIC APPARATUS

(71) Applicant: SAMSUNG ELECTRONICS CO., LTD., Suwon-si (KR)

(72) Inventors: Seokyoon Jung, Seoul (KR);
Byounglyong Choi, Seoul (KR);
Dongkyun Kim, Suwon-si (KR);
Sunghyun Nam, Yongin-si (KR);
Younghun Sung, Hwaseong-si (KR);
Sanghun Lee, Seoul (KR); Yangho Cho, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 167 days.

(21) Appl. No.: 15/435,545

(22) Filed: Feb. 17, 2017

(65) Prior Publication Data

US 2017/0235187 A1    Aug. 17, 2017

(30) Foreign Application Priority Data

Feb. 17, 2016    (KR) .......................... 10-2016-0018538

(51) Int. Cl.
*G02F 1/1335*    (2006.01)
*G02F 1/1343*    (2006.01)
(Continued)

(52) U.S. Cl.
CPC .......... *G02F 1/133528* (2013.01); *G02F 1/13* (2013.01); *G02F 1/134309* (2013.01);
(Continued)

(58) Field of Classification Search
None
See application file for complete search history.

(56) References Cited

U.S. PATENT DOCUMENTS 7,064,820 B2 *    6/2006    Isozaki .................. G01N 21/21
                                              356/237.2
8,049,841 B2 *   11/2011    Sugita .................. G02B 5/3058
                                              349/113
(Continued)

FOREIGN PATENT DOCUMENTS

JP            787554 B2     9/1995
JP         2011130138 A     6/2011
(Continued)

*Primary Examiner* — Cynthia Segura
(74) *Attorney, Agent, or Firm* — Sughrue Mion, PLLC (57) ABSTRACT

An electrical polarization filter, an electronic apparatus including the electrical polarization filter, and a method of operating the electronic apparatus are provided. The electrical polarization filter includes a liquid crystal panel configured to control a polarization angle of incident light and a polarization unit configured to display a linear polarization characteristic. The liquid crystal panel includes first and second transparent plates, first and second electrodes provided between the first transparent plate and the second transparent plate, and a liquid crystal layer provided between the first electrode and the second electrode, wherein the incident light directly enters one of the first and second transparent plate provided on an outer side. The polarization unit may be a passive type polarization unit or an active type polarization unit.

14 Claims, 9 Drawing Sheets

(51) Int. Cl.
*H04N 5/235* (2006.01)
*H04N 5/238* (2006.01)
*G02F 1/13* (2006.01)

(52) U.S. Cl.
CPC ........... *H04N 5/238* (2013.01); *H04N 5/2351* (2013.01); *G02F 2001/133548* (2013.01)

(56) References Cited

U.S. PATENT DOCUMENTS

| | | | |
|---|---|---|---|
| 8,508,646 B2 | 8/2013 | Katerberg | |
| 2003/0184744 A1* | 10/2003 | Isozaki | G01N 21/21 356/237.2 |
| 2006/0279670 A1* | 12/2006 | Tung | G02F 1/133528 349/56 |
| 2008/0094547 A1* | 4/2008 | Sugita | G02B 5/3058 349/96 |
| 2010/0045847 A1 | 2/2010 | Ryu | |
| 2010/0283957 A1* | 11/2010 | Matera | B29D 11/00634 351/49 |
| 2011/0242656 A1* | 10/2011 | Seo | G02B 27/285 359/489.07 |
| 2011/0315988 A1* | 12/2011 | Yu | H01L 27/14 257/52 |
| 2012/0169910 A1* | 7/2012 | Singh | G02B 26/00 348/302 |
| 2013/0135453 A1* | 5/2013 | Kanamori | A61B 1/00009 348/65 |
| 2013/0300986 A1* | 11/2013 | Kang | G02B 5/3058 349/96 |
| 2015/0042818 A1 | 2/2015 | Wada et al. | |
| 2015/0130962 A1 | 5/2015 | Hiramoto et al. | |
| 2015/0141753 A1* | 5/2015 | Kanamori | H01L 27/14627 600/109 |
| 2015/0206347 A1 | 7/2015 | Russell | |
| 2015/0278569 A1* | 10/2015 | Zolotov | G06K 7/10732 235/455 |
| 2015/0301280 A1 | 10/2015 | Chen et al. | |
| 2015/0323720 A1* | 11/2015 | Wu | G02B 5/3058 359/485.05 |
| 2015/0355490 A1* | 12/2015 | Kao | G02F 1/133502 349/12 |
| 2016/0252758 A1* | 9/2016 | Lee | G02B 27/0101 348/135 |
| 2016/0282639 A1* | 9/2016 | von und zu Liechtenstein | G02F 1/0136 |
| 2017/0108726 A1* | 4/2017 | Yanai | G02F 1/13362 |
| 2017/0227791 A1* | 8/2017 | von und zu Liechtenstein | G02F 1/01 |
| 2018/0164882 A1* | 6/2018 | Johnson | G06F 3/013 |
| 2018/0168496 A1* | 6/2018 | Sato | A61B 5/14552 |
| 2018/0358576 A1* | 12/2018 | Song | G02B 5/3016 |

FOREIGN PATENT DOCUMENTS

| | | |
|---|---|---|
| JP | 2012513607 A | 6/2012 |
| KR | 1020100023211 A | 3/2010 |

* cited by examiner

FIG. 10

ELECTRICAL POLARIZATION FILTER, ELECTRONIC APPARATUS INCLUDING THE SAME, AND METHOD OF OPERATING THE ELECTRONIC APPARATUS

CROSS-REFERENCE TO RELATED APPLICATION

This application claims priority from Korean Patent Application No. 10-2016-0018538, filed on Feb. 17, 2016 in the Korean Intellectual Property Office, the disclosure of which is incorporated herein by reference in its entirety.

BACKGROUND

1. Field

Apparatuses and methods consistent with exemplary embodiments relate to electrical polarization filters.

2. Description of the Related Art

When an object or information is displayed on a display, if ambient light or noise light exists besides main light, reflected light or scattered light may be generated by the ambient light. Accordingly, it may be difficult to recognize the object or information displayed on the display.

Light reflected by a surface of an object has a polarization characteristic. Thus, when a specific polarization filter is used in consideration of the polarization characteristic of the object, the reflected light or scattered light may be reduced or removed.

In the case of a camera having such a polarization filter, in order to obtain a polarization angle at which reflected light or scattered light is minimized, a desired polarization angle may be set by manually operating the polarization filter. If a polarization function is not required when the camera is used, the polarization filter may be carried separately from the camera.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide electrical polarization filters configured to reduce or remove noise light, such as reflected light or scattered light.

Further, one or more exemplary embodiments provide electronic apparatuses including electrical polarization filters and configured to automatically control a polarization angle according to a recognized image.

Further still, one or more exemplary embodiments provide methods of operating the electronic apparatuses.

According to an aspect of an embodiment, an electrical polarization filter includes a liquid crystal panel configured to control a polarization angle of incident light and a polarization unit configured to display a linear polarization characteristic.

The liquid crystal panel may include first and second transparent plates, first and second electrodes provided between the first transparent plate and the second transparent plate, and a liquid crystal layer provided between the first electrode and the second electrode, at this point, the incident light may directly enter one of the first and second transparent plate provided on an outer side.

The polarization unit may be a polarization plate that transmits light of a specific linear polarization component.

The polarization unit may include a plurality of nanowires.

The polarization unit may include a transparent substrate and a nanofilm on a surface of the transparent substrate, wherein the nanofilm may include a plurality of nanowires that are arranged.

The polarization unit may be an active polarization unit, and may include a nanowire layer that includes plurality of nanowires that are arranged in a given direction when a voltage is applied, a first electrode that contacts an upper surface of the nanowire layer, and a second electrode that contacts a lower surface of the nanowire layer.

According to an aspect of another embodiment, an electronic apparatus includes: an electrical polarization filter configured to reduce or remove noise light from incident light; an optical system configured to form an image by using light passed through the electrical polarization filter; an image sensor configured to recognize an image formed by the optical system; a polarization filter controller configured to control a polarization angle of the electrical polarization filter by interpreting an image given by the image sensor; and a display unit configured to display an image recognized by the image sensor.

The electrical polarization filter may include a liquid crystal panel and a polarization unit.

The polarization filter controller may include: an image interpretation unit configured to interpret an image given by the image sensor; a polarization angle computation unit configured to determine an amount of polarization angle control based on the interpretation result of the image interpretation unit; and a polarization angle control signal generator configured to provide a polarization angle control signal to the electrical polarization filter based on a signal given by the polarization angle computation unit.

The polarization unit may be a passive type polarization unit or an active type polarization unit.

The passive type polarization unit may transmit only light of a specific linear polarization component. Also, the passive type polarization unit may include a transparent substrate and a nanofilm on a surface of the transparent substrate, wherein the nanofilm includes a plurality of nanowires that are arranged.

The active type polarization unit may include a nanowire layer that comprises a plurality of nanowires arranged in a given direction when a voltage is applied, a first electrode that contacts an upper surface of the nanowire layer, and a second electrode that contacts a lower surface of the nanowire layer.

According to an aspect of another embodiment, a method of operating an electronic apparatus including an electrical polarization filter, the method includes: obtaining an image of an object; interpreting the obtained image; determining an amount of polarization angle control based on the interpretation result; and controlling a polarization angle of the electrical polarization filter according to the determined amount of polarization angle control.

The method may further include outputting the obtained image when an optical characteristic change of the obtained image is unnecessary according to the interpretation result of the obtained image.

The method may further include outputting the obtained image when an optical characteristic change of the obtained image is unnecessary according to the interpretation result of the image while repeating the operations from the operation of obtaining an image after performing the controlling the polarization angle.

According to an aspect of another embodiment, a method of operating an electronic apparatus including an electrical polarization filter, the method includes: obtaining a first image with respect to a first direction of an object; changing a polarization angle as much as a set value; obtaining a second image with respect to the first direction of the object; interpreting optical characteristics between the first and second images; changing the polarization angle of the electrical polarization filter in a direction of improving the optical characteristic based on the interpretation result; obtaining another image with respect to the first direction of the object; and analyzing an optical characteristic change (for example, a chroma change) with respect to the another image and an image taken directly ahead of the another image.

The method may further include outputting one of the first and second images when there is no an optical characteristic change between the first and second images according to the interpretation result.

The method may further include outputting the another image when there is no an optical characteristic change between the another image and the image taken directly ahead of the another image in the analyzing the optical characteristic change with respect to the another image and the image taken directly ahead of the another image, and repeating the changing of the polarization angle, the obtaining of another-image, and the analyzing of the optical characteristics when any optical characteristic change exists between the another image and the image taken directly ahead of the another image in the analyzing the optical characteristic change with respect to the another image and the image taken directly ahead of the another image.

BRIEF DESCRIPTION OF THE DRAWINGS

The above and/or other aspects will be more apparent by describing certain exemplary embodiments, with reference to the accompanying drawings, in which.

DETAILED DESCRIPTION

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the drawings, thicknesses of layers and regions may be exaggerated for convenience of explanation.

Figure 1:
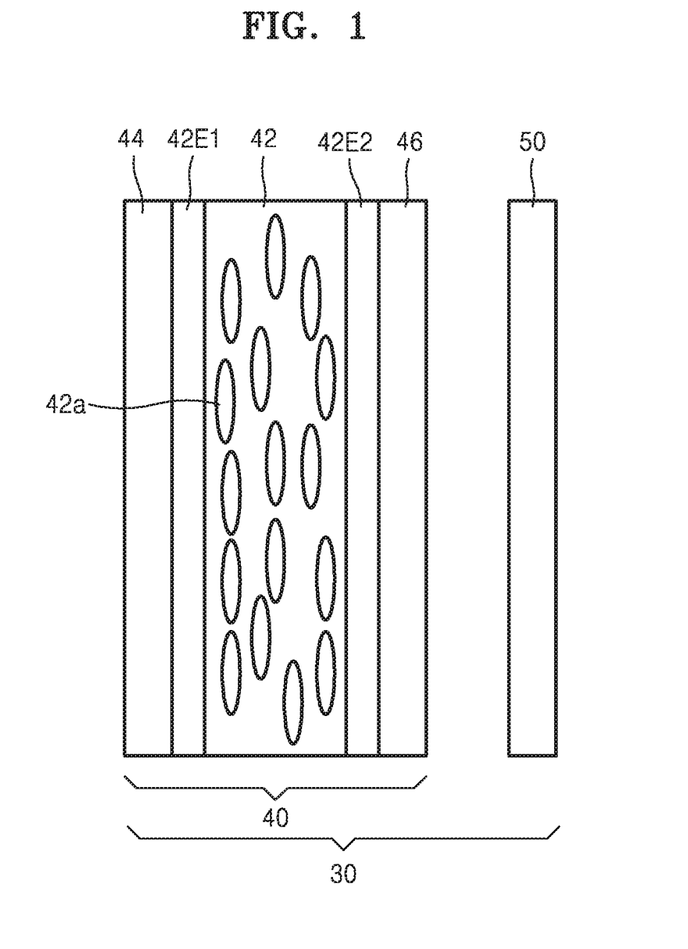
FIG. 1 is a cross-sectional view of an electrical polarization filter according to an example embodiment.

FIG. 1 is a cross-sectional view of an electrical polarization filter according to an example embodiment.

Referring to FIG. 1, an electrical polarization filter 30 may include a polarization angle control liquid crystal panel (hereinafter, a liquid crystal panel) 40 and a polarization unit 50. The liquid crystal panel 40 and the polarization unit 50 may be arranged in a row. The liquid crystal panel 40 may be disposed in front of the polarization unit 50. Light may enter the polarization unit 50 after entering a left side of the liquid crystal panel 40 and passing through the liquid crystal panel 40. The liquid crystal panel 40 may include a liquid crystal layer 42, first and second electrodes 42E1 and 42E2, and first and second transparent plates 44 and 46. The liquid crystal layer 42 may be disposed between the first and second electrodes 42E1 and 42E2. The liquid crystal layer 42 may be sealed so that liquid crystals do not leak. The liquid crystal layer 42 and the first and second electrodes 42E1 and 42E2 may be disposed between the first and second transparent electrodes 44 and 46. The first and second electrodes 42E1 and 42E2 may be optically transparent. For example, the first and second electrodes 42E1 and 42E2 may pass light within a certain wavelength band, and may absorb or block light beyond the wavelength band. The first and second electrodes 42E1 and 42E2 may be, for example, Indium Tin Oxide (ITO) electrodes. The first and second electrodes 42E1 and 42E2 may contact the liquid crystal layer 42. The first transparent plate 44 and the first electrode 42E1 may contact each other. The second transparent plate 46 and the second electrode 42E2 may contact each other. The first and second transparent plates 44 and 46 are optically transparent and may be, for example, glass plates. Grooves for orientating the direction of liquid crystals 42a in the liquid crystal layer 42 may be formed on surfaces adjacent to the liquid crystal layer 42, that is, inner surfaces of the first and second transparent plates 44 and 46. A dimension, material and distribution of the liquid crystals 42a included in the liquid crystal layer 42 are not limited to the above description.

Figure 2:
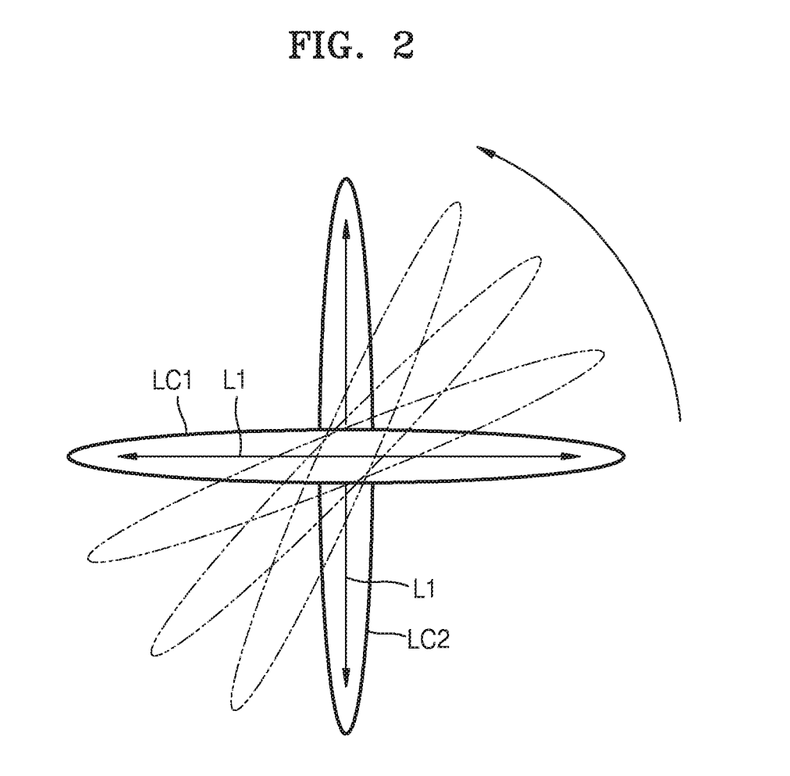
FIG. 2 is a front view of a liquid crystal layer in which a first liquid crystal adjacent to a first electrode and a second liquid crystal adjacent to a second electrode are twisted by an angle of 90° from each other in the electrical polarization filter of FIG. 1.

The liquid crystals 42a included in the liquid crystal layer 42 may be Twisted Nematic Liquid crystals (TNLC). Accordingly, when a voltage is not applied to the liquid crystal panel 40, as depicted in FIG. 2, in the liquid crystal layer 42, a first crystal LC1 adjacent to the first electrode 42E1 and a second liquid crystal LC2 adjacent to the second electrode 42E2 are twisted by an angle of 90° from each other. In this state, when light L1 that has a polarization state parallel to the first liquid crystal LC1 enters the first liquid crystal LC1, the light L1 proceeds along the twisted liquid crystals distributed between the first liquid crystal LC1 and the second liquid crystal LC2. Accordingly, when the light L1 comes out from the liquid crystal layer 42, a polarization surface of the light L1 is in a 90° rotated state, and has a polarization state parallel to the second liquid crystal LC2. In FIG. 2, dotted lines indicate twisted liquid crystals distributed between the first liquid crystal LC1 and the second liquid crystal LC2.

When a voltage is applied to the first and second electrodes 42E1 and 42E2, an electric field is generated between the first and second electrodes 42E1 and 42E2, and the liquid crystals 42a are arranged along the electric field. The arrangement state of the liquid crystals 42a varies according to a potential difference between the first and second electrodes 42E1 and 42E2. Also, according to the arrangement state of the liquid crystals 42a, that is, the degree of twisting of the liquid crystals 42a, change of polarization state of light that passes through the liquid crystal layer 42 may vary. That is, change of polarization angle may vary. Therefore, a polarization angle of light that enters the liquid crystal panel 40 may be controlled by controlling a voltage applied to the first and second electrodes 42E1 and 42E2.

The polarization unit 50 may display a given polarization state, for example, a linear polarization. Thus, the polarization state of incident light may be controlled by using the liquid crystal panel 40 in a state to combine the liquid crystal panel 40 with the polarization unit 50. In this way, ambient light or noise light included in the incident light, for example, reflected light or scattered light that may increase ambiguity of original information may be removed.

For example, when reflected light having a linear polarization is included in incident light that enters the electrical polarization filter 30 and a polarization state of the reflected light is perpendicular to the polarization state of the polarization unit 50, in a state that a voltage is not applied, the polarization state of the reflected light is rotated 90° by the liquid crystal layer 42.

Therefore, when the reflected light enters the polarization unit 50 after passing through the liquid crystal panel 40, the polarization state of the reflected light is parallel to the polarization state of the polarization unit 50, and thus, the reflected light may pass through the polarization unit 50.

However, when a voltage is applied to the polarization unit 50 and the applying voltage is controlled so that the liquid crystals 42a are arranged in parallel to an electric field that is applied to the liquid crystals 42a, the reflected light may pass through the liquid crystal panel 40 without changing the polarization state thereof. Accordingly, the reflected light enters the polarization unit 50 in a direction in which the polarization of the light is perpendicular to the polarization unit 50, and thus, the reflected light may not pass through the polarization unit 50. That is, the reflected light is removed from the incident light. In this manner, reflected light and/or scattered light included in incident light that enters the liquid crystal panel 40 may be removed or reduced by changing a polarization state of ambient light or noise light included in the light incident to the liquid crystal panel 40 via controlling a voltage applied to the liquid crystal panel 40. As a result, information included in the incident light may be further clearly and correctly recognized. That is, an object viewing through the electrical polarization filter 30 may be clearly recognized.

The polarization unit 50 may include a member that passively or actively displays a polarization state.

Figure 3:
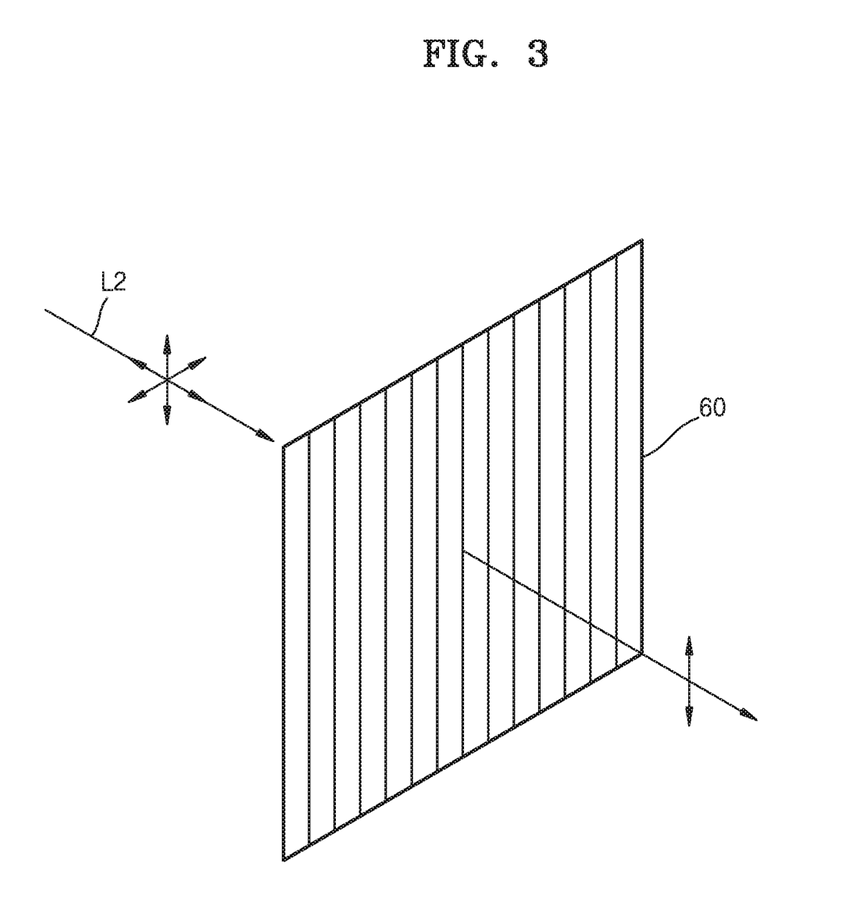
FIG. 3 is a perspective view of a polarization unit of FIG. 1 configured as a polarization plate.

When the polarization unit 50 has a passive polarization state, as depicted in FIG. 3, the polarization unit 50 may include a polarizing plate 60 having a given linear polarization. When light L2 that enters the polarizing plate 60 has a plurality of polarization states, the light L2 may become light having the same polarization state as the polarizing plate 60 after passing through the polarizing plate 60.

Figure 4:
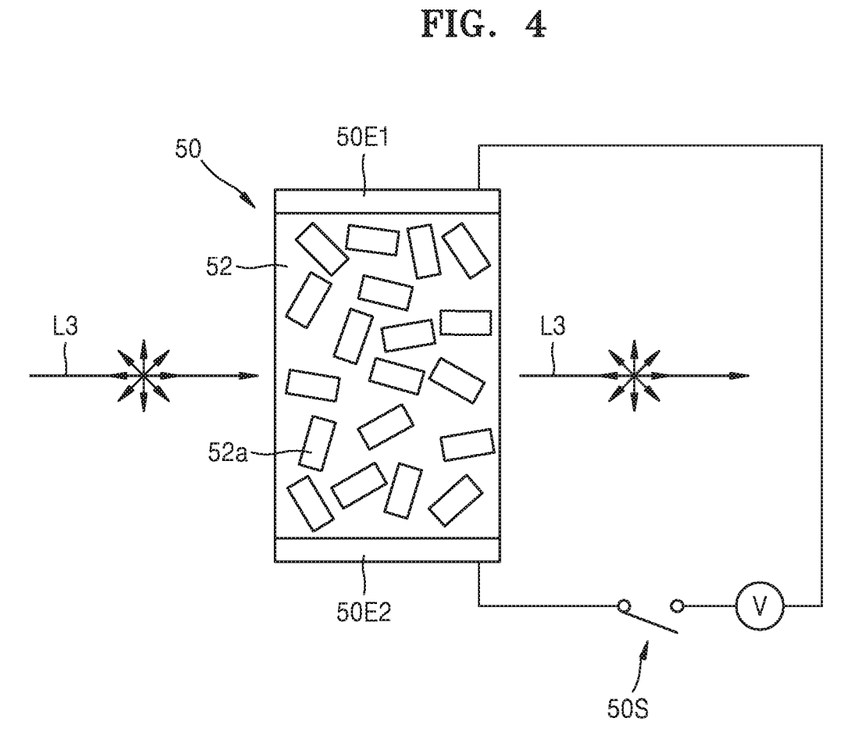
FIG. 4 is a cross-sectional view of a polarization unit in a state wherein an application voltage is OFF when the polarization unit of FIG. 1 is an active type polarization unit and includes a nanowire layer.

The polarization unit 50 may actively display a polarization state. As an example, as depicted in FIG. 4, the polarization unit 50 may include a nanowire layer 52 and first and second electrodes 50E1 and 50E2. The first and second electrodes 50E1 and 50E2 are not on a light path of incident light L3. The first electrode 50E1 may be disposed on an upper side of the nanowire layer 52. The second electrode 50E2 may be disposed on a lower side of the nanowire layer 52. The first electrode 50E1 may contact an upper surface of the nanowire layer 52. The second electrode 50E2 may contact a lower surface of the nanowire layer 52. The nanowire layer 52 may include a plurality of nanowires 52a or linear particles of a nano size. The plurality of nanowires 52a may be gold nanowires or copper nanowires, but are not limited thereto. A diameter of each of the plurality of nanowires 52a may be, for example, 100 nm or less or less than 1000 nm, and a length may be greater than the diameter. A cross-section of each of the plurality of the nanowires 52a may have a circular shape, a non-circular shape, or a polygonal shape, but the shape of the nanowires 52a is not limited thereto. Each of the plurality of nanowires 52a may be a straight line shape without bending, but the shape of each of the plurality of the nanowires 52a is not limited thereto.

The first and second electrodes 50E1 and 50E2 may be connected to a power source V. When a switch 50s is in an off state, that is, when a voltage is not applied to the first and second electrodes 50E1 and 50E2, the plurality of nanowires 52a included in the nanowire layer 52 are randomly distributed. That is, all of the plurality of nanowires 52a are not arranged. Accordingly, the light L3 that includes a plurality of polarization components and enters the nanowire layer 52 may pass through the nanowire layer 52 as it is without being affected to the polarization state thereof.

Figure 5:
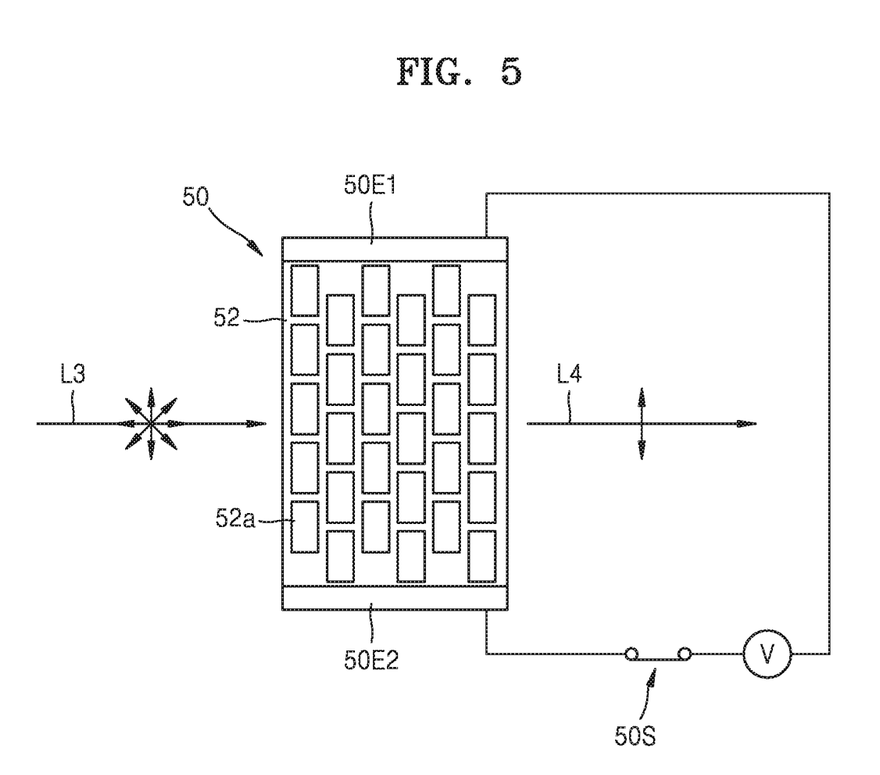
FIG. 5 is a cross-sectional view of a polarization unit in a state when an application voltage is ON when the polarization unit of FIG. 1 is an active type polarization unit and includes a nanowire layer.

However, when the switch 50s is in an on state, that is, when a voltage is applied to the first and second electrodes 50E1 and 50E2, as depicted in FIG. 5, the plurality of nanowires 52a included in the nanowire layer 52 are arranged in a row between the first and second electrodes 50E1 and 50E2. The nanowires 52a arranged in a row may have a linear polarization characteristic.

Accordingly, the light L3 that includes a plurality of polarization states when the light L3 enters the nanowire layer 52 becomes light L4 having the same polarization state (e.g., a linear polarization state) as the nanowire layer 52 after passing through the nanowire layer 52.

Figure 6A:
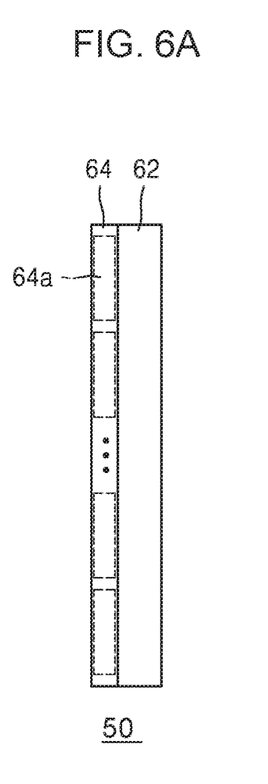
FIG. 6A and FIG. 6B respectively show a side view and a front view of a polarization unit according to another example embodiment.
Figure 6B:
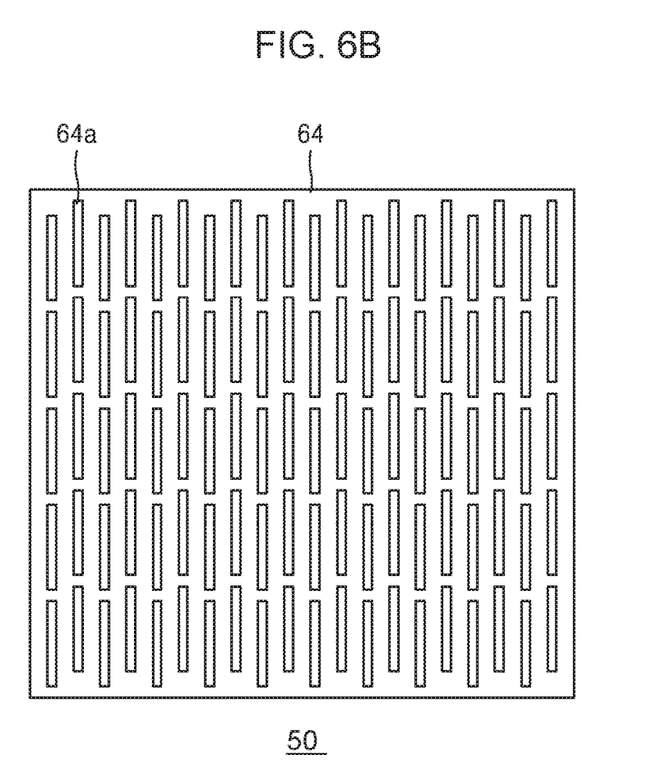

FIGS. 6A and 6B show a polarization unit 50 according to another example embodiment. In FIG. 6A, a side view of the polarization unit 50 is illustrated. In FIG. 6B, a front view of the polarization unit 50 is illustrated.

Referring to FIGS. 6A and 6B, the polarization unit 50 may include a transparent substrate 62 and a nanofilm 64. The nanofilm 64 may be disposed on a side of the transparent substrate 62. The nanofilm 64 may cover a surface of the transparent substrate 62 by using a coating method. Light that has passed through a liquid crystal panel 40 may sequentially pass through the nanofilm 64 and the transparent substrate 62. The nanofilm 64 may include a plurality of nanowires 64a. The thickness of the nanofilm 64 may correspond to a thickness of a single nanowire 64a.

Referring to FIG. 6B, the nanowires 64a are arranged in parallel to each other. A diameter of the nanowires 64a may be, for example, in a range from about 80 nm to about 100 nm, and a length may be greater than the diameter, for example, a few tens of times or a few hundreds of times greater than the diameter. As an example, the length of the nanowires 64a may be greater 200 times of the diameter. A cross-section of the nanowires 64a may have a circular shape, a non-circular shape, or a polygonal shape, but is not limited thereto. The nanowires 64a may have a straight line shape without bending, but the characteristics of the nanowires 64a are not limited thereto.

Next, an apparatus having the electrical polarization filter 30 will be described. The apparatus may be an electronic apparatus, for example, an optical apparatus that may continuously or discontinuously take images of an object. However, the electronic apparatus is not limited to an optical apparatus.

Figure 7:
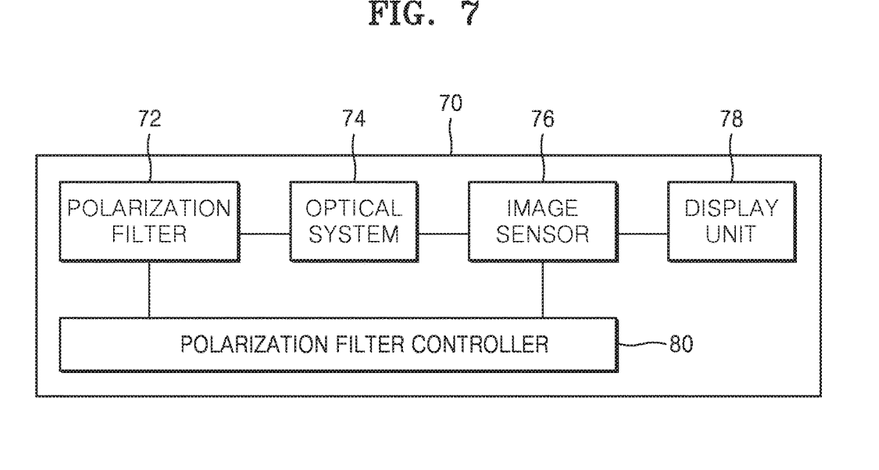
FIG. 7 is a block diagram of an electronic apparatus including a polarization filter according to an example embodiment.

FIG. 7 is a block diagram of an electronic apparatus including a polarization filter according to an example embodiment.

Referring to FIG. 7, an apparatus 70 may include a polarization filter 72, an optical system 74, an image sensor 76, a display unit 78, and a polarization filter controller 80. The polarization filter 72 may be the electrical polarization filter 30 of FIG. 1. The polarization filter 72 may be disposed in front of the optical system 74. The polarization filter 72 may directly or indirectly contact the optical system 74. The optical system 74 may be used for forming an image of an object on the image sensor 76 by using light entering through the polarization filter 72. The optical system 74 may be an optical system that includes a single lens or a plurality of lenses. For example, the optical system 74 may be an optical system included in a camera. The image sensor 76 may be disposed next to the optical system 74. For example, the optical system 74 may be located between the polarization filter 72 and the image sensor 76. The image sensor 76 may be configured to be included in the optical system 74. The image sensor 76 may transmit an image of an object to the display unit 78 by recognizing the image formed by the optical system 74. The image recognized by the image sensor 76 may be also transmitted to the polarization filter controller 80 to control a polarization angle of the polarization filter 72. The display unit 78 displays the image transmitted from the image sensor 76 so that the user can view the image. For example, the display unit 78 may be a display panel. The display unit 78 may be a separate device that is separated from the apparatus 70. The polarization filter controller 80 may be disposed between the polarization filter 72 and the image sensor 76. The polarization filter controller 80 may be electrically connected to the polarization filter 72 and the image sensor 76. A polarization angle of light incident to the polarization filter 72 may be controlled through interpretation and/or analysis of an image provided from the image sensor 76. For this purpose, the polarization filter controller 80 transmits a polarization angle control signal generated as a result of the interpretation and/or analysis of an image to the polarization filter 72. A polarizing angle of light incident to the polarization filter 72 may be increased or decreased according to the polarization angle control signal provided from the polarization filter controller 80. The polarization angle control signal may be a voltage signal that may affect to the change of intensity of an electric field generated in the polarization filter 72.

Figure 8:
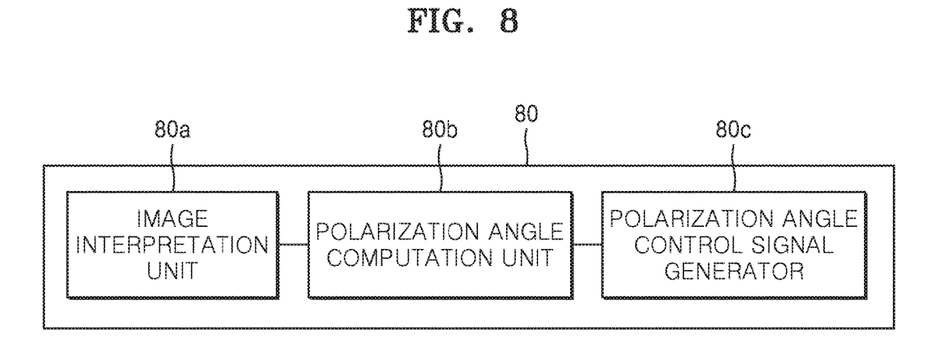
FIG. 8 is a block diagram of a polarization filter controller of FIG. 7.

As depicted in FIG. 8, the polarization filter controller 80 may include an image interpretation unit 80a, a polarization angle computation unit 80b, and a polarization angle control signal generator 80c. The image interpretation unit 80a may obtain optical data of the image by optically interpreting or analyzing the image provided from the image sensor 76. The optical data may be a chroma, and may be data of whole optics, such as brightness, contrast, image distortion, etc. bedsides the chroma. The optical data may be obtained by comparing with a set data or by comparing the image (hereinafter, a reference image) with other images that are taken before or after the reference image. The reference and the other images are images that are consecutively taken for an identical object. At this point, the other images may be images taken as the same surface of the object in the same direction as the reference image is taken. Accordingly, the shape of the object included in the reference image and the other images may be the same.

The polarization angle computation unit 80b determines the degree of controlling the polarization angle of the polarization filter 72 in what direction (+ direction or − direction) based on the optical data provided from the image interpretation unit 80a. That is, the polarization angle computation unit 80b determines an amount of polarization angle control or variation of the polarization angle based on the optical data. The amount of polarization angle control may be set in advance according to the optical data. The polarization angle computation unit 80b transmits a signal corresponding to the determined amount of polarization angle control to the polarization angle control signal generator 80c. The polarization angle control signal generator 80c transmits a control signal to control a polarization angle of the polarization filter 72 as much as the determined amount of polarization angle control according to the signal provided from the polarization angle computation unit 80b to the polarization filter 72. According to the control signal, a voltage applied to electrodes (the first and second electrodes 40E1 and 40E2 of FIG. 1) provided on both sides of a liquid crystal layer (the liquid crystal layer 42 of FIG. 1) of the polarization filter 72 may vary.

A method of operating an apparatus including a polarization filter according to an example embodiment will be described with reference to FIGS. 9 and 10.

Figure 9:
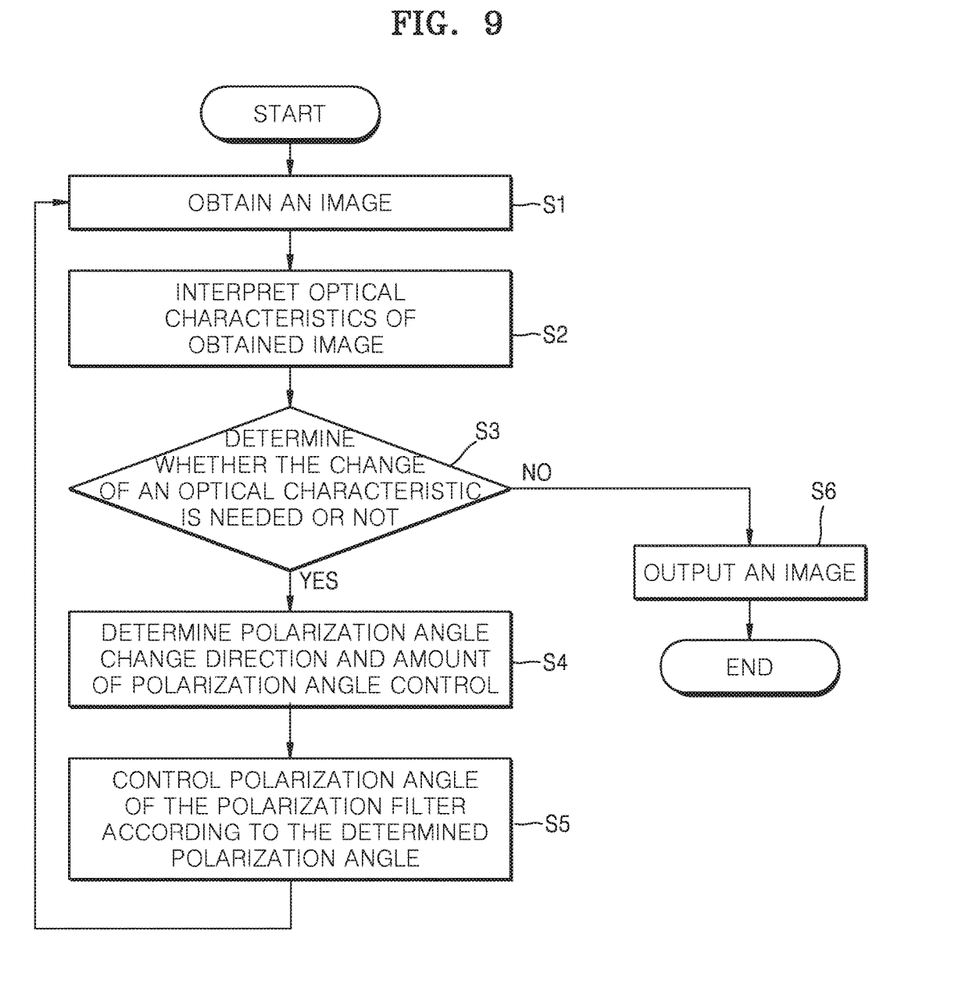
FIG. 9 is a flowchart of a method of operating an electronic apparatus having a polarization filter according to an example embodiment.

FIG. 9 is a flowchart of a method of operating (a first operation method) an electronic apparatus having a polarization filter according to an example embodiment.

Referring to FIG. 9, the first operation method may include the following operations, that is, obtaining an image (operation S1); interpreting or analyzing optical characteristics (e.g., chroma) of the obtained image (operation S2); determining whether the change of an optical characteristic for the image is needed or not (operation S3); determining a polarization angle change direction and an amount of polarization angle control (operation S4); controlling a polarization angle of the polarization filter according to the determined polarization angle (operation S5); and outputting an image (operation S6). In operation S3, when an amount of light scattered or reflected by the liquid crystal panel is greater than a threshold value, it may be determined that the change of the optical characteristic is necessary. However, the first operation method is not limited to the above operations.

In the operation of interpreting or analyzing optical characteristics (operation S2), when a change of the optical characteristics of the image is needed (YES), the subsequent operations (operations S4 and S5) may be sequentially performed. In the operation of interpreting or analyzing optical characteristics (operation S2), when a change of the optical characteristics of the image is not needed (NO), the corresponding image is outputted and displayed (operation S6). When an optical characteristic change of an image is needed (YES), the subsequent operation of determining a direction (+ direction or − direction) of changing a polarization angle and the amount of polarization angle control (operation S4) and the operation of controlling the polarization angle of the polarization filter according to the determined polarization angle may be sequentially performed. After a polarization angle of the polarization filter is controlled, the operations may be repeated from the operation of obtaining an image (operation S1). The operation of interpreting or analyzing optical characteristics of an image (operation S2) may be an operation of interpreting and/or analyzing the optical data of an image. For example, the operation of interpreting or analyzing optical characteristics of an image (operation S2) may include an operation of interpreting a chroma change of the image. The operation of controlling a polarization angle of a polarization filter (operation S5) may include controlling a voltage applied to a liquid crystal panel (the liquid crystal panel 40 of FIG. 1).

Figure 10:
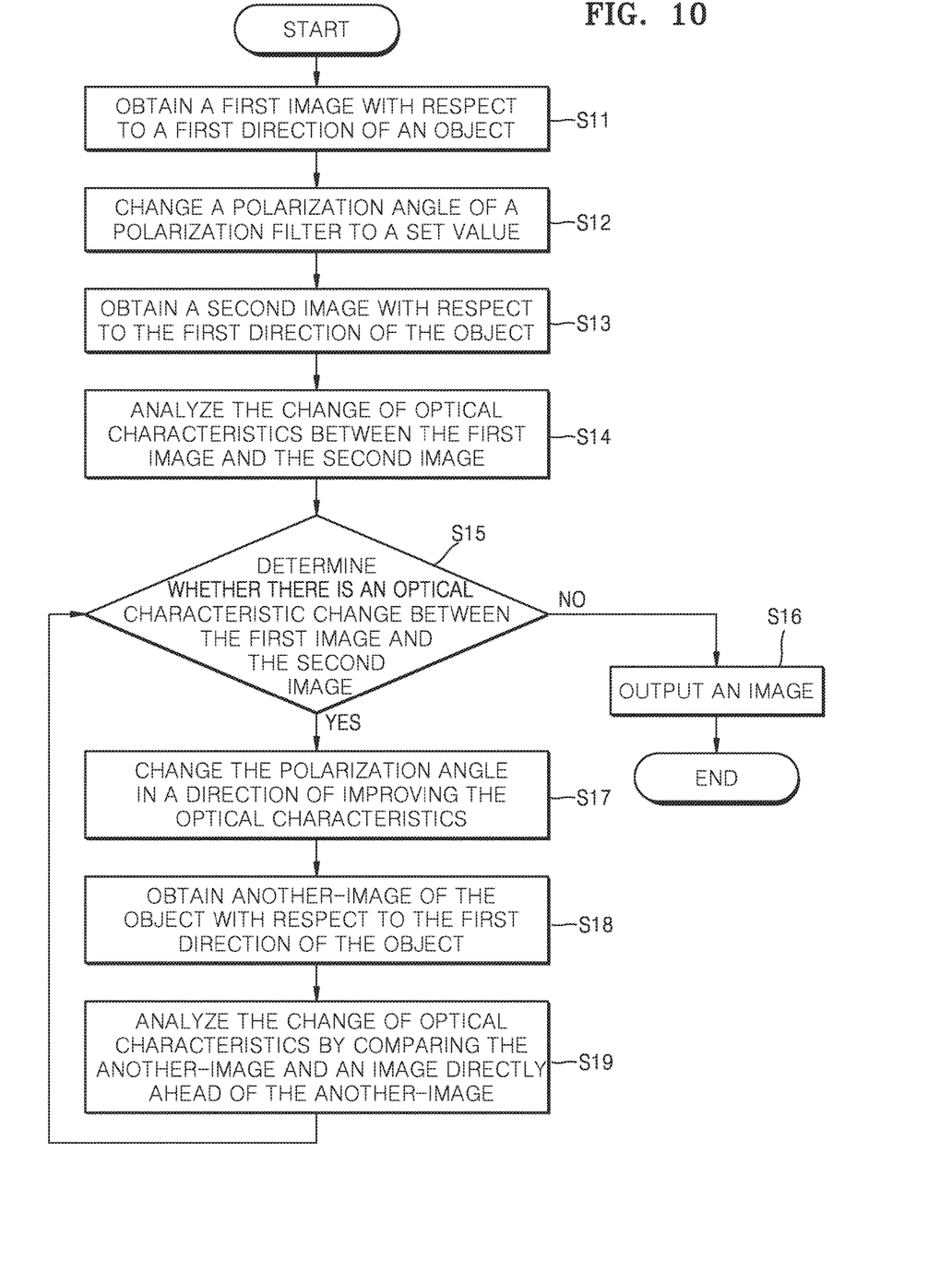
FIG. 10 is a flowchart of a method of operating an electronic apparatus having a polarization filter according to another example embodiment.

FIG. 10 is a flow chart of a method of operating (a second operation method) an electronic apparatus having a polarization filter according to another example embodiment.

Referring to FIG. 10, the second operation method may include obtaining a first image with respect to a first direction of an object (operation S11); changing a polarization angle of a polarization filter to a set value (operation S12); obtaining a second image with respect to the first direction of the object (operation S13); analyzing, as a first analysis, the change of optical characteristics between the first image and the second image (operation S14); determining whether there is an optical characteristic change or not between the first image and the second image according to the analysis result (operation S15); changing the polarization angle in a direction of improving the optical characteristics (operation S17); obtaining another image with respect to the first direction of the object (operation S18); analyzing the change of optical characteristics by comparing the another image with an image taken directly ahead of the another image (operation S19); and outputting an image (operation S16).

In the operation of determining whether there is an optical characteristic change or not between the first image and the second image according to the analysis result (operation S15), when there is any change of optical characteristics between the first image and the second image (YES), operations S17, S18, and S19 are sequentially performed. In operation S15, when there is no change of optical characteristics between the first image and the second image (NO), the first image or the second image may be outputted. The operation of changing the polarization angle of the polarization filter in a direction of improving optical characteristics (operation S17) may include an operation of continuously changing the polarization angle or an operation of discontinuously (gradationally) changing the polarization angle. That is, in operation S17, a voltage applied to a liquid crystal panel of a polarization filter may be continuously or gradationally controlled.

After obtaining another image of the object with respect to the first direction in operation S18, the change of optical characteristics between the another image and an image taken directly ahead of the another image is analyzed, as a second analysis, by comparing the two images in operation S19. Afterwards, in operation S15, it is determined whether there is any change in the optical characteristics between the another image and the image taken directly ahead of the another image or not. In operation S15, when there is no optical characteristic change between the another image and the image taken directly ahead of the another image (NO), the another image is outputted, and when there is any optical characteristic change between the another image and the image taken directly ahead of the another-image (YES), operations S17, S18, and S19 are repeated.

Factors, for example, dazzle that hinders the recognition of an object or displaying information may be removed by removing or reducing scattered light or reflected light, and thus, an eye fatigue may be reduced.

Also, a polarization angle of an electrical polarization filter according to the current example embodiment may be automatically (electronically) controlled according to a recognized image. Accordingly, reducing or removing efficiency of scattered light or reflected light may be increased. Thus, an object or information may be correctly (clearly) recognized, thereby reducing twisting or misunderstanding of an object or information.

Due to the characteristics of the electrical polarization filter described above, the electrical polarization filter may be used for various apparatuses, for example, cameras, mobile phones, TVs, or monitors. Also, the electrical polarization filter may be alone used by being attached to a surface of a specific body.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, it is understood that in exemplary embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electrical polarization filter comprising:
   a liquid crystal panel configured to control a polarization angle of light incident onto the liquid crystal panel; and
   a polarization panel configured to have a linear polarization characteristic,
   wherein the polarization panel comprises only a single polarization element having a plurality of nanowires that are vertically arranged to a progressing direction of light incident to the polarization panel from the liquid crystal panel.

2. The electrical polarization filter of claim 1, wherein the liquid crystal panel comprises:
   a first transparent plate;
   a second transparent plate;
   a first electrode and a second electrode that are disposed between the first transparent plate and the second transparent plate; and a liquid crystal layer disposed between the first electrode and the second electrode,
wherein the incident light directly enters one of the first and second transparent plates.

3. The electrical polarization filter of claim 1, wherein the polarization panel is configured to transmit light of a specific linear polarization component.

4. The electrical polarization filter of claim 1, wherein the polarization panel comprises:
a transparent substrate; and
a nanofilm on a surface of the transparent substrate,
wherein the nanofilm comprises the plurality of nanowires.

5. The electrical polarization filter of claim 1, wherein the polarization panel is an active polarization panel and comprises:
a nanowire layer comprising the plurality of nanowires;
a first electrode that contacts an upper surface of the nanowire layer; and
a second electrode that contacts a lower surface of the nanowire layer.

6. An electronic apparatus comprising:
the electrical polarization filter of claim 1 configured to reduce or remove noise from light incident onto the electrical polarization filter;
an optical system configured to generate an image based on the light passed through the electrical polarization filter;
an image sensor configured to recognize the image generated by the optical system; and
a polarization filter controller configured to interpret the image recognized by the image sensor and control a polarization angle of the electrical polarization filter based on the interpreted image.

7. The electronic apparatus of claim 6, wherein the polarization filter controller comprises:
an image interpretation unit configured to interpret the image recognized by the image sensor;
a polarization angle computation unit configured to determine an amount of the polarization angle to be controlled based on the interpreted image; and
a polarization angle control signal generator configured to provide a polarization angle control signal to the electrical polarization filter based on a signal output by the polarization angle computation unit.

8. The electronic apparatus of claim 6, wherein the polarization panel is a passive type polarization panel.

9. The electronic apparatus of claim 8, wherein the passive type polarization panel configured to transmit only light of a specific linear polarization component.

10. The electronic apparatus of claim 8 wherein the passive type polarization panel comprises:
a transparent substrate; and
a nanofilm on a surface of the transparent substrate,
wherein the nanofilm comprises a plurality of nanowires.

11. The electronic apparatus of claim 6, wherein the polarization panel is an active type polarization panel.

12. A method of operating an electronic apparatus including an electrical polarization filter, the electrical polarization filter including a liquid crystal panel to control a polarization angle of light incident onto the liquid crystal panel, and a polarization panel having a linear polarization characteristic and including only a single polarization element having a plurality of nanowires that are vertically arranged to a progressing direction of light incident to the polarization panel from the liquid crystal panel, the method comprising:
obtaining an image of an object based on the light incident onto the liquid crystal panel;
interpreting the image of the object;
determining a control amount of the polarization angle based on the interpreted image; and
controlling the polarization angle of the electrical polarization filter based on the determined control amount of the polarization angle.

13. The method of claim 12, further comprising:
determining that an optical characteristic change of the obtained image is unnecessary in response to an amount of the incident light being greater than a threshold value; and
outputting the obtained image when the optical characteristic change of the obtained image is determined to be unnecessary.

14. The method of claim 12, further comprising:
determining that an optical characteristic change of the obtained image is unnecessary in response to an amount of the incident light being greater than a threshold value;
repeating the obtaining the image after performing the controlling the polarization angle; and
outputting the obtained image when the optical characteristic change of the obtained image is determined to be unnecessary.

* * * * *